US006827163B2

(12) United States Patent
Amsbury et al.

(10) Patent No.: US 6,827,163 B2
(45) Date of Patent: Dec. 7, 2004

(54) NON-LINEAR CONTROL OF A BALANCING VEHICLE

(75) Inventors: Burl Amsbury, Boulder, CO (US); J. Douglas Field, Bedford, NH (US); John M. Kerwin, Manchester, NH (US); John B. Morrell, Bedford, NH (US); Jonathan B. Pompa, La Jolla, CA (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 10/460,053

(22) Filed: Jun. 12, 2003

(65) Prior Publication Data

US 2004/0007398 A1 Jan. 15, 2004

Related U.S. Application Data

(63) Continuation-in-part of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965.
(60) Provisional application No. 60/388,723, filed on Jun. 14, 2002.

(51) Int. Cl.$^7$ .............................................. B62D 57/00
(52) U.S. Cl. ...................... 180/7.1; 180/8.2; 180/218
(58) Field of Search ........................... 180/7.1, 8.1–8.3, 180/21, 65.1, 65.8, 209, 218, 908; 701/22, 69

(56) References Cited

U.S. PATENT DOCUMENTS

| 584,127 A | 6/1897 | Draullette et al. |
| 849,270 A | 4/1907 | Schafer et al. |
| 2,742,973 A | 4/1956 | Johannesen |
| 3,145,797 A | 8/1964 | Taylor |
| 3,260,324 A | 7/1966 | Suarez |

(List continued on next page.)

FOREIGN PATENT DOCUMENTS

| DE | 2 048 593 | 5/1971 |
| DE | 31 28 112 A1 | 2/1983 |
| DE | 32 42 880 A1 | 6/1983 |
| DE | 3411489 A1 | 10/1984 |
| DE | 44 04 594 A 1 | 8/1995 |

(List continued on next page.)

OTHER PUBLICATIONS

Kawaji, S., *Stabilization of Unicycle Using Spinning Motion*, Denki Gakkai Ronbushi, D, vol. 107, Issue 1, Japan (1987), pp. 21–28.

Schoonwinkel, A., *Design and Test of a Computer–Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

*Primary Examiner*—Lesley D. Morris
*Assistant Examiner*—Matthew Luby
(74) *Attorney, Agent, or Firm*—Bromberg & Sunstein LLP

(57) ABSTRACT

A class of transporters for carrying an individual over ground having a surface that may be irregular. Various embodiments have a motorized drive, mounted to the ground-contacting module that causes operation of the transporter in an operating position that is unstable with respect to tipping when the motorized drive arrangement is not powered. Methods of controlling the transporter are described that allow the dynamic behavior of the transporter to more closely match preferences of a rider. These methods include providing preferential responsiveness to change in pitch angles and pitch rates.

5 Claims, 9 Drawing Sheets

U.S. PATENT DOCUMENTS

| | | |
|---|---|---|
| 3,283,398 A | 11/1966 | Andren |
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,860,264 A | 1/1975 | Douglas et al. |
| 3,872,945 A | 3/1975 | Hickman et al. |
| 3,952,822 A | 4/1976 | Udden et al. |
| 4,018,440 A | 4/1977 | Deutsch |
| 4,062,558 A | 12/1977 | Wasserman |
| 4,076,270 A | 2/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,151,892 A | 5/1979 | Francken |
| 4,222,449 A | 9/1980 | Feliz |
| 4,264,082 A | 4/1981 | Fouchey, Jr. |
| 4,266,627 A | 5/1981 | Lauber |
| 4,293,052 A | 10/1981 | Daswick et al. |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,510,956 A | 4/1985 | King |
| 4,560,022 A | 12/1985 | Kassai |
| 4,566,707 A | 1/1986 | Nitzberg |
| 4,570,078 A | 2/1986 | Yashima et al. |
| 4,571,844 A | 2/1986 | Komasaku et al. |
| 4,624,469 A | 11/1986 | Bourne, Jr. |
| 4,657,272 A | 4/1987 | Davenport |
| 4,685,693 A | 8/1987 | Vadjunec |
| 4,709,772 A | 12/1987 | Brunet |
| 4,716,980 A | 1/1988 | Butler |
| 4,740,001 A | 4/1988 | Torleumke |
| 4,746,132 A | 5/1988 | Eagan |
| 4,770,410 A | 9/1988 | Brown |
| 4,786,069 A | 11/1988 | Tang |
| 4,790,400 A | 12/1988 | Sheeter |
| 4,790,548 A | 12/1988 | Decelles et al. |
| 4,794,999 A | 1/1989 | Hester |
| 4,798,255 A | 1/1989 | Wu |
| 4,802,542 A | 2/1989 | Houston et al. |
| 4,809,804 A | 3/1989 | Houston et al. |
| 4,834,200 A | 5/1989 | Kajita |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,919,225 A | 4/1990 | Sturges |
| 4,953,851 A | 9/1990 | Sherlock et al. |
| 4,984,754 A | 1/1991 | Yarrington |
| 4,985,947 A | 1/1991 | Ethridge |
| 4,998,596 A | 3/1991 | Miksitz |
| 5,002,295 A | 3/1991 | Lin |
| 5,011,171 A | 4/1991 | Cook |
| 5,052,237 A | 10/1991 | Reimann |
| 5,111,899 A | 5/1992 | Reimann |
| 5,158,493 A | 10/1992 | Morgrey |
| 5,161,820 A | 11/1992 | Vollmer |
| 5,168,947 A | 12/1992 | Rodenborn |
| 5,171,173 A | 12/1992 | Henderson et al. |
| 5,186,270 A | 2/1993 | West |
| 5,221,883 A | 6/1993 | Takenaka et al. |
| 5,241,875 A | 9/1993 | Kochanneck |
| 5,248,007 A | 9/1993 | Watkins et al. |
| 5,314,034 A | 5/1994 | Chittal |
| 5,350,033 A | 9/1994 | Kraft |
| 5,366,036 A | 11/1994 | Perry |
| 5,376,868 A | 12/1994 | Toyoda et al. |
| 5,419,624 A | 5/1995 | Adler et al. |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,971,091 A | 10/1999 | Kamen et al. |
| 5,973,463 A | 10/1999 | Okuda et al. |
| 5,975,225 A | 11/1999 | Kamen et al. |
| 5,986,221 A | 11/1999 | Stanley |
| 6,003,624 A | 12/1999 | Jorgensen et al. |
| 6,039,142 A | 3/2000 | Eckstein et al. |
| 6,050,357 A | 4/2000 | Staelin et al. |
| 6,059,062 A | 5/2000 | Staelin et al. |
| 6,125,957 A | 10/2000 | Kauffmann |
| 6,131,057 A | 10/2000 | Tamaki et al. |
| 6,223,104 B1 | 4/2001 | Kamen et al. |
| 6,225,977 B1 | 5/2001 | Li |
| 6,288,505 B1 | 9/2001 | Heinzmann et al. |
| 6,302,230 B1 | 10/2001 | Kamen et al. |
| 6,367,817 B1 * | 4/2002 | Kamen et al. ................. 180/21 |
| 6,651,763 B1 * | 11/2003 | Kamen et al. .............. 180/171 |
| 6,651,766 B2 * | 11/2003 | Kamen et al. .............. 180/218 |
| 2002/0063006 A1 | 5/2002 | Burl et al. |
| 2003/0205419 A1 * | 11/2003 | Kamen et al. ................. 180/21 |
| 2003/0226698 A1 * | 12/2003 | Kamen et al. .............. 180/65.1 |
| 2004/0011573 A1 * | 1/2004 | Kamen et al. ................. 180/7.1 |
| 2004/0055795 A1 * | 3/2004 | Kamen et al. ................. 180/7.1 |

FOREIGN PATENT DOCUMENTS

| | | |
|---|---|---|
| DE | 196 25 498 C 1 | 11/1997 |
| DE | 298 08 091 U1 | 10/1998 |
| DE | 298 08 096 U1 | 10/1998 |
| EP | 0 109 927 | 7/1984 |
| EP | 0 193 473 | 9/1986 |
| EP | 0 537 698 A1 | 4/1993 |
| EP | 0663 313 A1 | 7/1995 |
| EP | 0 958 978 A2 | 11/1999 |
| FR | 980 237 | 5/1951 |
| FR | 2 502 090 | 9/1982 |
| GB | 152664 | 2/1922 |
| GB | 1213930 | 11/1970 |
| GB | 2 139 576 A | 11/1984 |
| JP | 52-44933 | 10/1975 |
| JP | 57-87766 | 6/1982 |
| JP | 57-110569 | 7/1982 |
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 2-190277 | 7/1990 |
| JP | 4-201793 | 7/1992 |
| JP | 6-171562 | 12/1992 |
| JP | 5-213240 | 8/1993 |
| JP | 6-105415 | 12/1994 |
| JP | 7255780 | 3/1995 |
| WO | WO 86/05752 | 10/1986 |
| WO | WO 89/06117 | 7/1989 |
| WO | WO 96/23478 | 8/1996 |
| WO | WO 98/46474 | 10/1998 |
| WO | WO 00 75001 A | 12/2000 |

* cited by examiner

NON-LINEAR CONTROL OF A BALANCING VEHICLE

The present application is a continuation-in-part application of application Ser. No. 09/325,976, filed Jun. 4, 1999, which is a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091, which is a continuation in part of U.S. application Ser. No. 08/250,693, filed May 27, 1994, now issued as U.S. Pat. No. 5,701,965. This application also claims priority from provisional application, Ser. No. 60/388,723, filed Jun. 14, 2002. All of the above applications are incorporated herein by reference.

TECHNICAL FIELD AND BACKGROUND ART

The present invention pertains to transporters and methods for transporting individuals, and more particularly to balancing transporters and methods for transporting individuals over ground having a surface that may be irregular.

A wide range of transporters and methods are known for transporting human subjects. Typically, such transporters rely upon static stability, being designed so as to be stable under all foreseen conditions of placement of their ground-contacting members. Thus, for example, the gravity vector acting on the center of gravity of an automobile passes between the points of ground contact of the automobile's wheels, the suspension keeping all wheels on the ground at all times, and the automobile is thus stable. Another example of a statically stable transporter is the stair-climbing transporter described in U.S. Pat. No. 4,790,548 (Decelles et al.).

SUMMARY OF THE INVENTION

In an embodiment of the invention, a transporter is provided for carrying a user. The transporter includes:

a platform which supports a payload including the user, a ground-contacting module, mounted to the platform, including at least one ground-contacting member, characterized by a ground contact region, and defining a fore-aft plane;

a motorized drive arrangement, coupled to the ground-contacting module; the drive arrangement, ground-contacting module and payload constituting a system being unstable with respect to tipping in at least the fore-aft plane when the motorized drive is not powered, the system characterized by a pitch angle offset from a specified pitch angle and a pitch rate offset from a specified pitch rate; and a control loop in which the motorized drive arrangement is included, for dynamically maintaining stability of the system in the fore-aft plane by operation of the motorized drive arrangement so that the net torque experienced by the system about the region of contact with the surface causes a specified acceleration of the system, the net torque including a contribution related to the pitch angle offset multiplied by a first gain wherein the first gain is a function of at least one of an orientation and a displacement of the device.

In another embodiment of the invention, a balancing transporter is provided. The transporter is characterized by an instantaneous displacement and orientation. The transporter includes a motorized drive for propelling the transporter; and a control loop in which the motorized drive arrangement is included, for dynamically maintaining stability of the system in the fore-aft plane by operation of the motorized drive arrangement so that the net torque experienced by the system about the region of contact with the surface causes a specified acceleration of the system, the net torque including a contribution functionally related to at least one of the pitch angle, pitch rate, wheel position and wheel velocity, wherein the functional relation varies with at least one of an orientation and a displacement of the device.

In another embodiment of the invention, a method is provided for carrying a payload including a user with a transporter. The method comprises providing a transporter including:

a platform which supports a payload including the user, a ground-contacting module, mounted to the platform, including at least one ground-contacting member, characterized by a ground contact region and a fore-aft plane;

a motorized drive arrangement, coupled to the ground-contacting module; the drive arrangement, ground-contacting module and payload constituting a system being unstable with respect to tipping in at least the fore-aft plane when the motorized drive is not powered, the system characterized by a pitch angle offset from a specified pitch angle and a pitch rate offset from a specified pitch rate; and causing the motorized drive to operate the ground-contacting module using a control loop in which the motorized drive arrangement is included, for dynamically maintaining stability of the system in the fore-aft plane by operation of the motorized drive arrangement so that the net torque experienced by the system about the region of contact with the surface causes a specified acceleration of the system. The net torque includes a contribution related to the pitch angle offset multiplied by a first gain $K_1'$ when the pitch angle offset is greater than or equal to zero and to the pitch angle offset multiplied by a second gain $K_1''$ when the pitch angle offset is less than zero; and a contribution related to the pitch rate offset multiplied by a third gain $K_2'$ when the pitch rate offset is greater than or equal to zero, and to the pitch rate offset multiplied by a fourth gain $K_2''$ when the pitch rate offset is less than zero, wherein at least one of a first gain pair consisting of $K_1'$ and $K_1''$ and a second gain pair consisting of $K_2'$ and $K_2''$ are unequal.

In a specific embodiment of the preceding embodiment of the invention, the magnitude of $K_1'$ is less than the magnitude of $K_1''$. In a further specific embodiment, $K_2'$ equals $K_2''$.

Embodiments of the invention advantageously allow the response of the transporter to be tailored to rider preferences.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
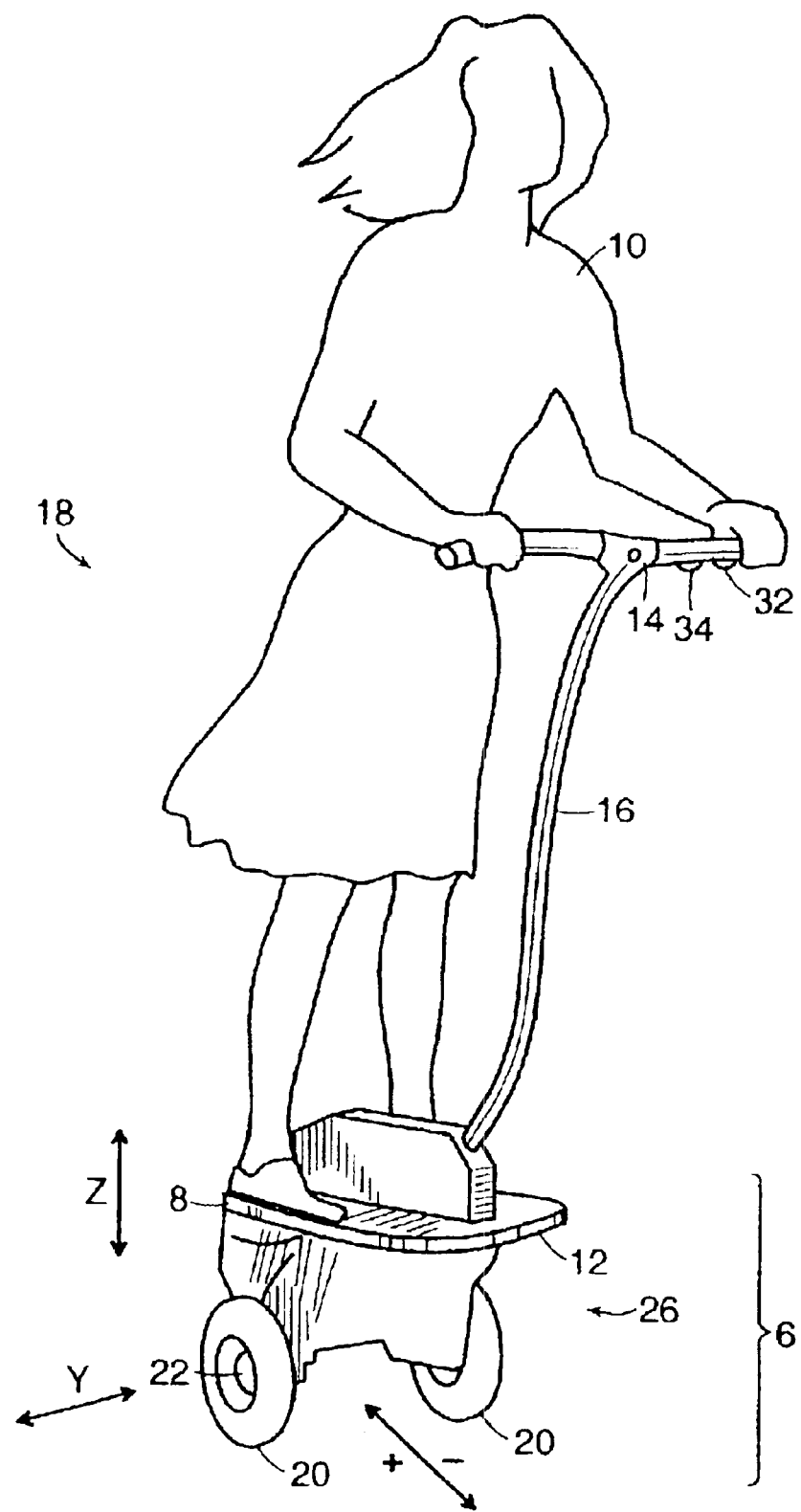
FIG. 1 is a side view of a personal transporter lacking a stable static position, in accordance with a preferred embodiment of the present invention, for supporting or conveying a subject who remains in a standing position thereon.

The subject matter of this application is related to U.S. Pat. Nos. 5,701,965; 5,971,091; 5,791,425; 6,302,230; and U.S. Pat. No. 6,581,714, "Transporter Improvements," filed Oct. 13, 2000, which are all incorporated herein by reference in their entirety. The subject matter of this application is also related to the following U.S. provisional patent applications: "Speed Limit Determination for a Balancing Transporter," Ser. No. 60/388,845; "Gain Scheduling in Control of a Balancing Transporter," Ser. No. 60/388,723, "Method and Device for Battery Charge Equalization," Ser. No. 60/388,986; and "Speed Limiter for a Balancing Transporter," Ser. No. 60/389,134, all filed on Jun. 14, 2002, all of which are incorporated herein by reference in their entirety.

An alternative to operation of a statically stable transporter is that dynamic stability may be maintained by action of the user, as in the case of a bicycle or motorcycle or scooter, or, in accordance with embodiments of the present invention, by a control loop, as in the case of the human transporter described in U.S. Pat. No. 5,701,965. The invention may be implemented in a wide range of embodiments. A characteristic of many of these embodiments is the use of a pair of laterally disposed ground-contacting members to suspend the subject over the surface with respect to which the subject is being transported. The ground or other surface, such as a floor, over which a transporter in accordance with the invention is employed may be referred to generally herein as the "ground." The ground-contacting members are typically motor-driven. In many embodiments, the configuration in which the subject is suspended during locomotion lacks inherent stability at least a portion of the time with respect to a vertical in the fore-aft plane but is relatively stable with respect to a vertical in the lateral plane. Stability, as defined below, means that in response to a perturbation a stable device will tend towards its unperturbed state.

Some embodiments of the invention invoke the concept of primary wheels. The term "primary wheels," as used in this description and in any appended claims, refers to a minimum set of a transporter's wheels on which the transporter is capable of operating stably. More generally, the term "primary ground-contacting members" allows for a more general class of members, that includes but is not limited to wheels. Hence, as used in this description and in any appended claims, "primary ground-contacting members" refers to a minimum set of a transporter's ground-contacting members on which the transporter is capable of operating stably. Other ground-contacting members may include, without limitation: arcuate sections of a wheel, clusters of wheels, treads, etc.

In various embodiments of the invention, fore-aft stability may be achieved by providing a control loop, in which one or more motors are included, for operation of a motorized drive in connection with the ground-contacting members. As described below, a pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially adjacent, radially supported and rotatably mounted arcuate elements. In these embodiments, the ground-contacting members are driven by the motorized drive in the control loop in such a way as to maintain, when the transporter is not in locomotion, the center of mass of the transporter above the region of contact of the ground-contacting members with the ground, regardless of disturbances and forces operative on the transporter.

A ground-contacting member typically has a "point" (actually, a region) of contact or tangency with the surface over which the transporter is traveling or standing. Due to the compliance of the ground-contacting member, the "point" of contact is actually an area, where the region of contact may also be referred to as a contact patch. The weight of the transporter is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

Figure 8:
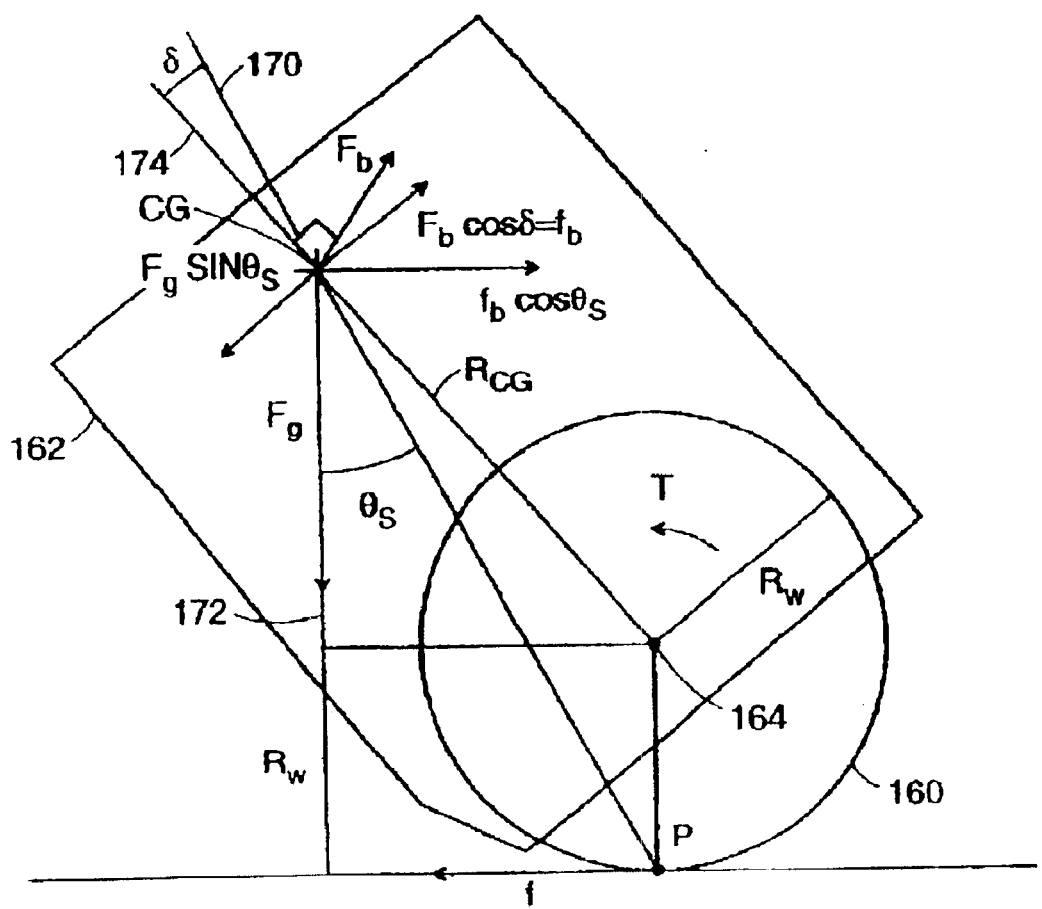
FIG. 8 shows an illustrative diagram of an idealized balancing transporter with a rigid wheel in motion at a constant velocity across a flat surface.

A force in the direction of motion is required to overcome rolling friction (and other frictional forces, including air resistance). Gravity may be used, in accordance with preferred embodiments of the invention, to provide a torque about the point of contact with the surface in a direction having a component in the sense of desired motion. Referring to FIG. 8, to illustrate these principles, a diagram is shown of the forces acting on a transporter that locomotes with constant velocity v on a single wheel over a flat surface. The principles now discussed may readily be generalized to operation on a sloped surface and to accommodate any other external forces that might be present. Wheel 160 of radius $R_w$ rotates with respect to chassis 162 about axle 164 and contacts the underlying surface at point P. For purposes of illustration only, it is assumed that wheel 160 contacts the surface at a point.

The wheel is driven with respect to the transporter by a torque T (supplied by a motor, for example) which in turn creates a reaction torque −T on the transporter. Since the torque acts about the axle 164, the reaction torque corresponds to a force $F_b$ acting at the center of gravity (CG) of the system, including the transporter and payload, where $F_b = T/R_{CG}$, where $R_{CG}$ is the distance between the axle and the CG of the system. The line 170 from the CG to point P is at an angle $\theta_s$ relative to the vertical 172.

The rolling friction, f, acting on the wheel at point P, is proportional to the velocity v of the rim of the wheel, with the proportionality expressed as $f = \mu v$. For constant velocity to be maintained, this force f must be exactly canceled. Consequently, with gravity providing the force, the condition that must be satisfied is:

$$F_b \cos \theta_s = f_b, \qquad \text{(Eqn. 1)}$$

where $f_b$ is the component of the reaction force acting transverse to axis 174 between the CG and point P. In order to prevent the transporter from falling, a stability condition must also exist, namely that no net force acts on the CG in a direction transverse to line 170, i.e., there is no net torque about the point of contact P during motion at constant velocity (i.e., in an inertial frame of reference where the point P is fixed). This condition may be expressed as:

$$F_g \sin \theta_s = f_b, \qquad \text{(Eqn. 2)}$$

where $F_g \sin \theta_s$ is the "tipping" component of gravity, and $f_b$ is the counter-tipping component of the reactive force on the transporter caused by wheel rotation ($f_b = F_b \cos \theta$), and where $\theta$ is the angle shown line 170 and line 174.

Eqns. 1 and 2 may be combined to yield $F_g \sin \theta_s \cos \theta_s = f = \mu v$, thus, in the limit of small angles (where $\sin \theta$ is approximately $\theta$), $$\theta_s = (\mu/F_g)v, \qquad (Eqn. 3)$$

showing that increasing velocity requires increased lean to overcome the effects of friction. Additionally, a control loop that imposes stability on the system will respond to an increased lean by increasing velocity of the system. While the preceding discussion assumed constant velocity, additional lean beyond that required to overcome the effects of friction will result in acceleration since an additional forward-directed force acts on the CG. Conversely, in order to achieve acceleration (or deceleration) of the transporter, additional leaning (forward or backward) must be provided in a manner discussed in further detail below.

FIG. 1 shows a simplified embodiment of the invention. A personal transporter is shown and designated generally by numeral 18. A subject 10 stands on a support platform 12 and holds a grip 14 on a handle 16 attached to the platform 12, so that the transporter 18 of this embodiment may be operated in a manner analogous to a scooter. A control loop may be provided so that leaning of the subject results in the application of torque to wheel 20 about axle 22 thereby causing an acceleration of the transporter. Transporter 18, however, is statically unstable, and, absent operation of the control loop to maintain dynamic stability, subject 10 will no longer be supported in a standing position and will fall from platform 12. Different numbers of wheels or other ground-contacting members may advantageously be used in various embodiments of the invention as particularly suited to varying applications. Thus, as described in greater detail below, the number of ground-contacting members may be any number equal to, or greater than, one. For many applications, the dimensions of platform 12, and indeed of the entire ground-contacting module, designated generally by numeral 6, are advantageously comparable to the dimensions of the footprint or shoulder width of user 10. Thus transporter 18 may advantageously be used as a mobile work platform or a recreational transporter such as a golf cart, or as a delivery transporter.

Transporter 18 may be operated in a station-keeping mode, wherein balance is maintained substantially at a specified position. Additionally, transporter 18, which may be referred to herein, without limitation, as a "transporter," may also maintain a fixed position and orientation when the user 10 is not on platform 12. This mode of operation, referred to as a "kickstand" mode, provides a convenience for the user. A force plate 8 or other sensor, disposed on platform 12, detects the presence of a user on the transporter.

Figure 2:
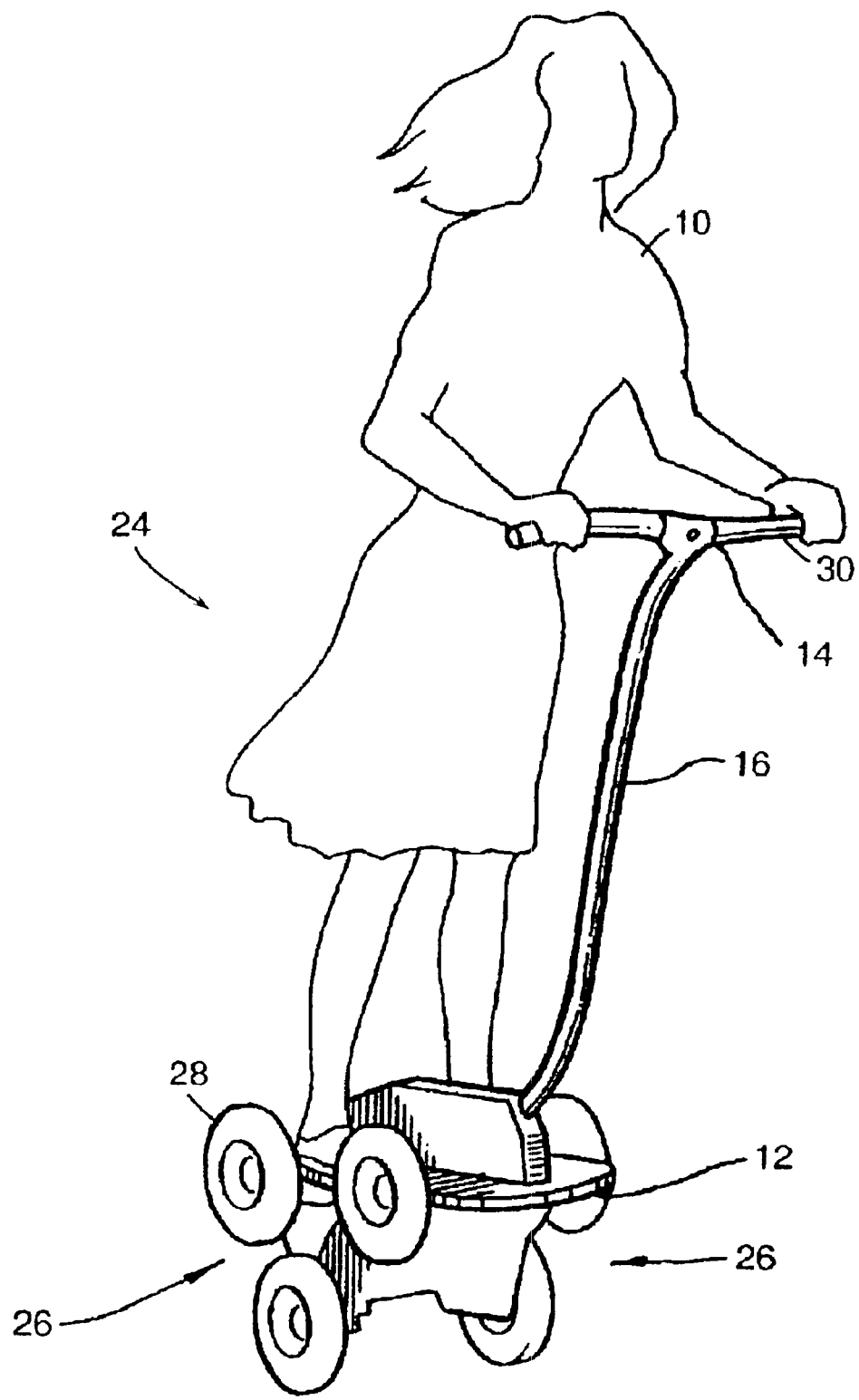
FIG. 2 is a perspective view of a further personal transporter lacking a stable static position, in accordance with an alternate embodiment of the present invention.

Another embodiment of a balancing transporter in accordance with the present invention is shown in FIG. 2 and designated generally by numeral 24. Personal transporter 24 shares the characteristics of transporter 18 of FIG. 1, namely a support platform 12 for supporting subject 10 and grip 14 on handle 16 attached to platform 12, so that the transporter 18 of this embodiment may also be operated in a manner analogous to a scooter. FIG. 2 shows that while transporter 24 may have clusters 26 each cluster having a plurality of wheels 28, transporter 24 remains statically unstable and, absent operation of a control loop to maintain dynamic stability, subject 10 will no longer be supported in a standing position and will fall from platform 12. In the embodiment of FIG. 2, as in the embodiment of FIG. 1, the primary ground-contacting members are a pair of wheels. Supplemental ground-contacting members may be used in stair climbing and descending or in traversing other obstacles. In one mode of operation, for example, it is possible to rotate clusters 26 so that two wheels on each of the clusters are simultaneously in contact with the ground. Stair climbing and flat-terrain locomotion may both be achieved, however, with the transporter supported on only a single set of primary ground-contacting members.

Operation of the balancing transporter will be described with reference to the set of coordinate axes shown in FIG. 1. Gravity defines the vertical axis z, while the axis coincident with the wheel axis 22 may be used to define a lateral axis y, and a fore-aft axis x is defined by the forward direction of motion of the transporter. The plane defined by the vertical axis z and the lateral axis y will sometimes be referred to as the "lateral plane", and the plane defined by the fore-aft axis x and the vertical axis z will sometimes be referred to as the "fore-aft plane". Directions parallel to the axes x and y are called the fore-aft and lateral directions respectively. It can be seen that the transporter, when relying on the pair of wheels 20 for contacting the ground, is inherently unstable with respect to a vertical in the fore-aft direction, but is relatively stable with respect to a vertical in the lateral direction. In other embodiments of the invention described below, the transporter may also be unstable with respect to yaw about the z axis.

The axes may also be defined with respect to platform 12 in cases such as where the ground-contacting member is a uniball.

Figure 3:
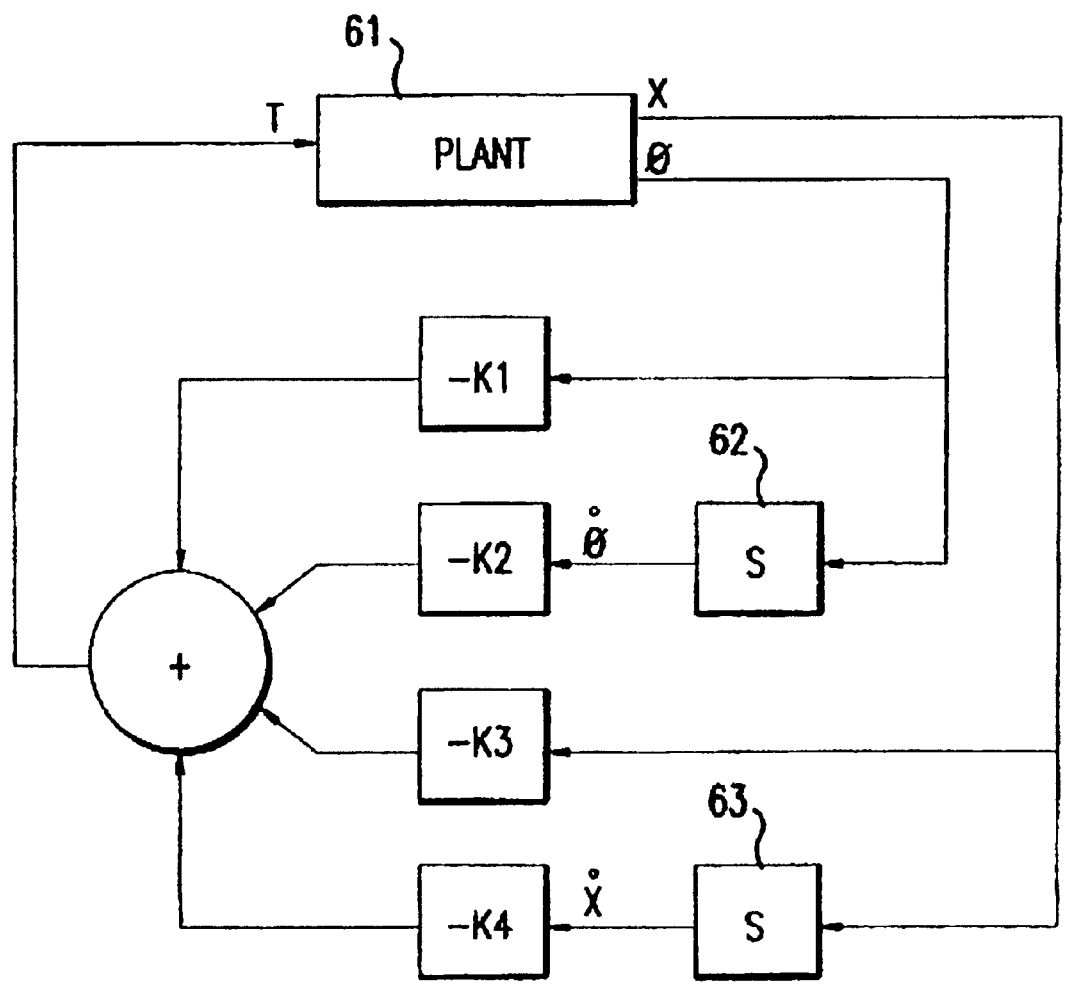
FIG. 3 illustrates the control strategy for a simplified version of FIG. 1 to achieve balance using wheel torque.

A simplified control algorithm for achieving balance in the embodiment of the invention according to FIG. 1 when the wheels are active for locomotion is shown in the block diagram of FIG. 3. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta - \theta_0) + K_2(\dot{\theta} - \dot{\theta}_0) + K_3(x - x_0) + K_4(\dot{x} - \dot{x}_0) \qquad (Eqn. 4)$$

where:

T denotes a torque applied to a ground-contacting element about its axis of rotation;

$\theta$ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a subscripted variable denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 3 maintains balance and also proximity to the reference point on the surface in the presence of disturbances such as changes to the system's center of mass with respect to the reference point on the surface due to body motion of the subject or contact with other persons or objects. It should be noted that the amplifier control may be configured to control motor current (in which case torque T is commanded, as shown in FIG. 3) or, alternatively, the voltage applied to the motor may be controlled, in which case the commanded parameter is velocity.

The effect of $\theta_0$ in the above control equation (Eqn. 4) is to produce a specified offset $\theta_0$ from the non-pitched position where $\theta=0$. Adjustment of $\theta_0$ will adjust the vehicle's offset from a non-pitched position. As discussed in further detail below, in various embodiments, pitch offset may be adjusted by the user, for example, by means of a thumb wheel 32, shown in FIG. 1. An adjustable pitch offset is useful under a variety of circumstances. For example, when operating the vehicle on an incline, it may be desirable for the operator to stand erect with respect to gravity when the vehicle is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

The size of $K_3$ will determine the extent to which the transporter will seek to return to a given location. With a non-zero $K_3$, the effect of $x_0$ is to produce a specified offset $-x_0$ from the fiducial reference by which x is measured. When $K_3$ is zero, the transporter has no bias to return to a given location. The consequence of this is that if the transporter is caused to lean in a forward direction, the transporter will move in a forward direction, thereby maintaining balance. Such a configuration is discussed further below.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the transporter is moving.

"Stability" as used in this description and in any appended claims refers to the mechanical condition of an operating position with respect to which the system will naturally return if the system is perturbed away from the operating position in any respect.

In order to accommodate two wheels instead of the one-wheel system illustrated for simplicity in FIG. 3, separate motors may be provided for left and right wheels of the transporter and the torque desired from the left motor and the torque desired from the right motor can be calculated separately in the general manner described below in connection with FIG. 7. Additionally, tracking both the left wheel motion and the right wheel motion permits adjustments to be made to prevent unwanted turning of the transporter and to account for performance variations between the two drive motors.

Figure 4:
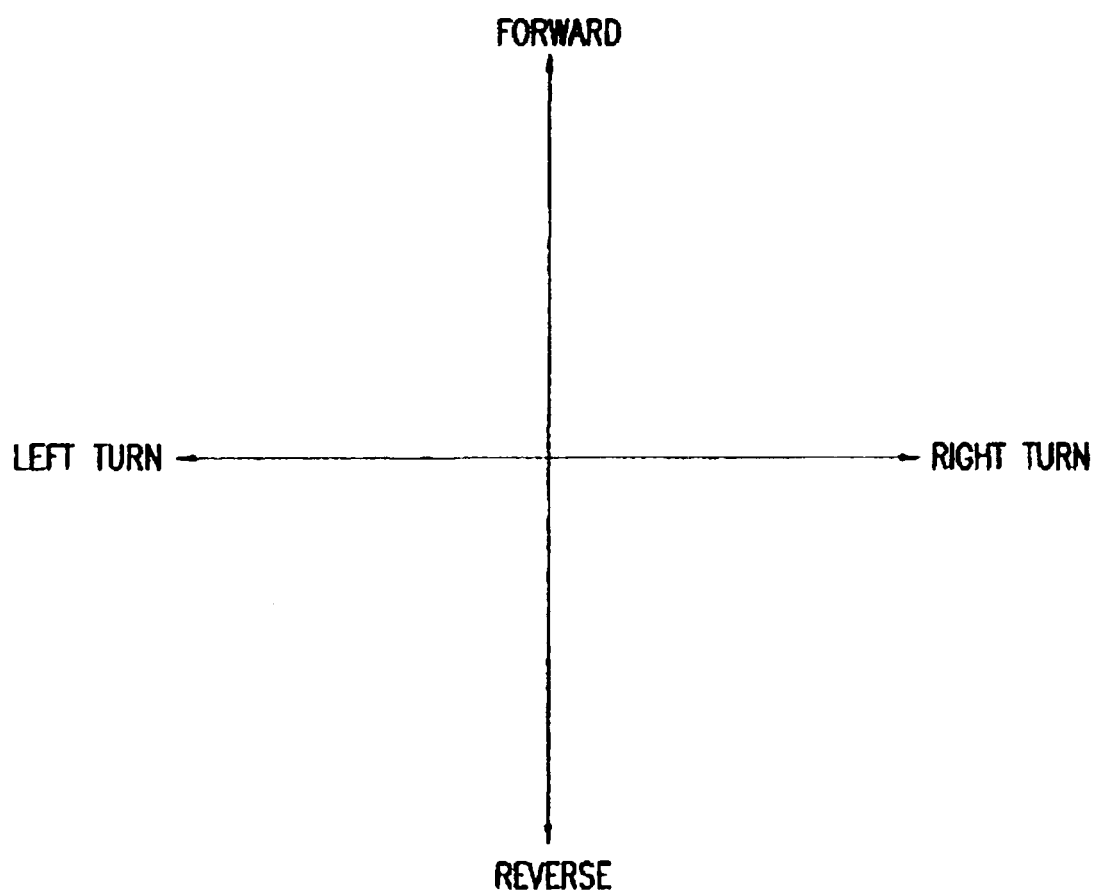
FIG. 4 illustrates diagrammatically the operation of joystick control of the wheels of the embodiment of FIG. 1.

In cases where gain $K_3$ is zero, a user control input such as a joystick may be used to adjust the torques of each motor. The joystick has axes indicated in FIG. 4. In operation of this embodiment, forward motion of the joystick is used to cause forward motion of the transporter, and reverse motion of the joystick causes backward motion of the transporter. A left turn similarly is accomplished by leftward motion of the joystick. For a right turn, the joystick is moved to the right. The configuration used here permits the transporter to turn in place when the joystick is moved to the left or to the right, by causing rotation of left and right motors, and hence left and right wheels, at equal rates in opposite senses of rotation. With respect to forward and reverse motion an alternative to the joystick is simply leaning forward or backward (in a case where $K_3$ is zero), since the pitch sensor (measuring $\theta$) would identify a pitch change that the system would respond to, leading to forward or reverse motion, depending on the direction of lean. In such instances, other types of yaw control (i.e., control to accomplish turning right or left) can be used. Alternatively, control strategies based on fuzzy logic can be implemented.

It can be seen that the approach of adjusting motor torques when in the balance mode permits fore-aft stability to be achieved without the necessity of additional stabilizing wheels or struts (although such aids to stability may also be provided). In other words, stability is achieved dynamically, by motion of the components of the transporter (in this case constituting the entire transporter) relative to the ground.

Figure 5:
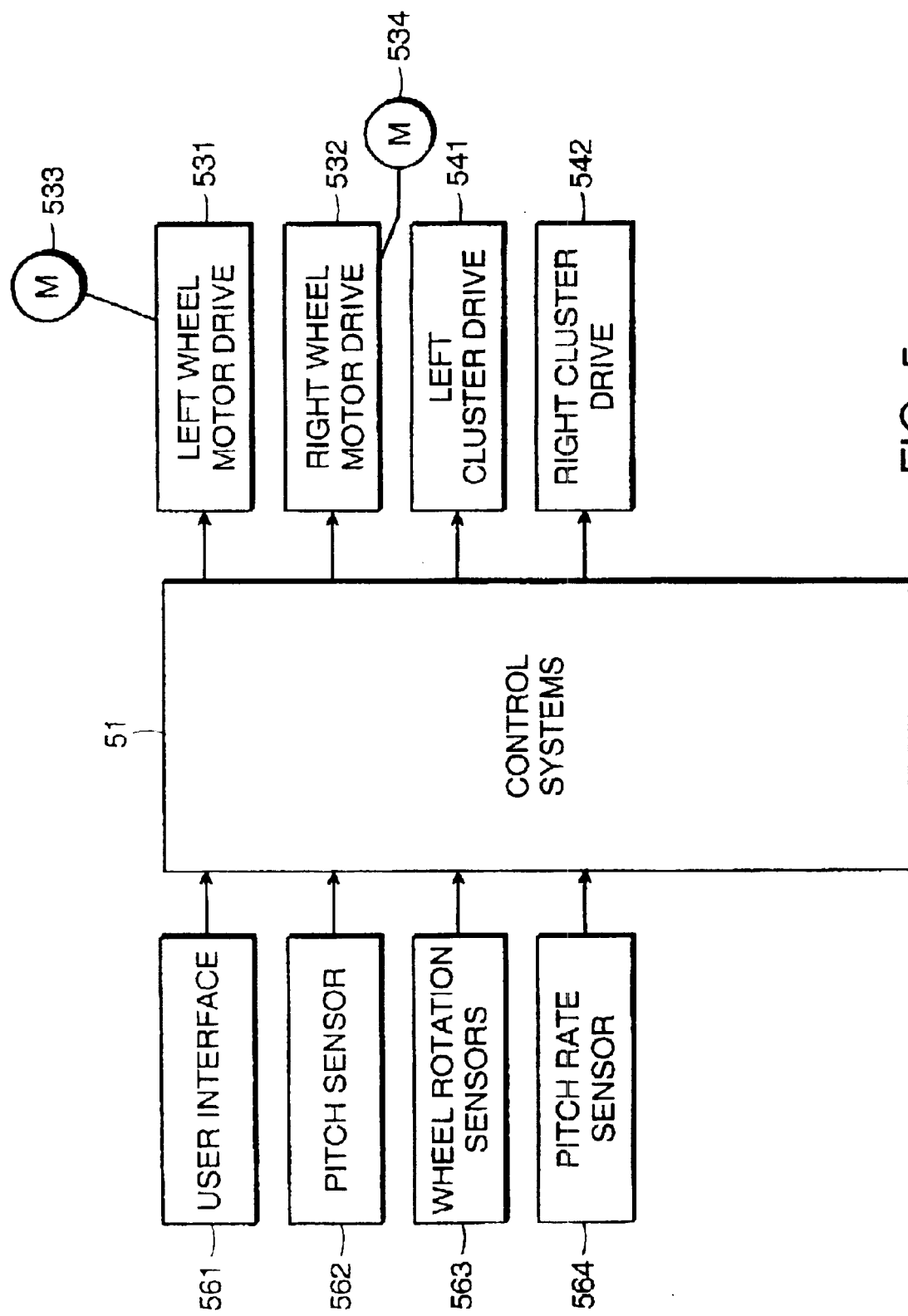
FIG. 5 is a block diagram showing generally the nature of sensors, power and control with the embodiment of FIG. 1.

In the block diagram of FIG. 5 it can be seen that a control system 51 is used to control the motor drives and actuators of the embodiment of FIGS. 1-3 to achieve locomotion and balance. These include motor drives 531 and 532 for left and right wheels respectively. If clusters are present as in the embodiment of FIG. 2, actuators 541 and 542 for left and right clusters respectively. The control system has data inputs including user interface 561, pitch sensor 562 for sensing fore-aft pitch, wheel rotation sensors 563, and pitch rate sensor 564. Pitch rate and pitch may be derived through the use of gyroscopes or inclinometers, for example, alone or in combination. The inputs include the desired transporter pitch theta (desired), the actual measured pitch theta, the pitch rate thetadot, and the component of the wheel rotation velocity that is common to the two primary wheels, omega com. Both theta and thetadot are typically derived from inertial sensing, as described in U.S. Pat. No. 6,332,103, which is incorporated herein by reference.

A grip 14 (shown in FIG. 1) may be conveniently provided with a thumb wheel 32 (shown in FIG. 1) or thumb-operated joystick for directional control, although other methods of control may also be used. Thumb wheel 32 may serve multiple control purposes as will now be described.

In accordance with other embodiments of the invention, handle 16 and grip 14 may be absent altogether, and the platform 12 may be equipped with sensors, such as force plate 8, for example, to detect leaning of the subject. Indeed, as described in connection with FIG. 5 and as further described below, the pitch of the transporter is sensed and may be used to govern operation of the control loop, so that if the subject leans forward, the transporter will move forward to maintain a desired velocity or to provide desired acceleration. Accordingly, a forward lean of the subject will cause the transporter to pitch forward and produce forward movement; a backward lean will cause the transporter to pitch backward and produce backward movement. Appropriate force transducers may be provided to sense leftward and rightward leaning and related controls provided to cause left and right turning as a result of the sensed leaning.

Leaning may also be detected using proximity sensors. Additionally, operation of the transporter may be governed on the basis of the orientation of the user with respect to the platform.

In a further embodiment, the transporter may be equipped with a foot- (or force-) actuated switch sensitive to the presence of a user on the transporter. Thus, for example, the transporter may be powered automatically upon ascent of a user onto the platform. Conversely, when the user alights from the transporter, power can be removed and the transporter disabled. Alternatively, the transporter may be programmed to enter a dynamic "kickstand" mode in which the transporter remains balanced in place when the user alights. Thus, the transporter is ready for the user to resume travel by reboarding the transporter. Furthermore, the transporter is thus safely parked while not actively operated by a user aboard the transporter.

Figure 6:
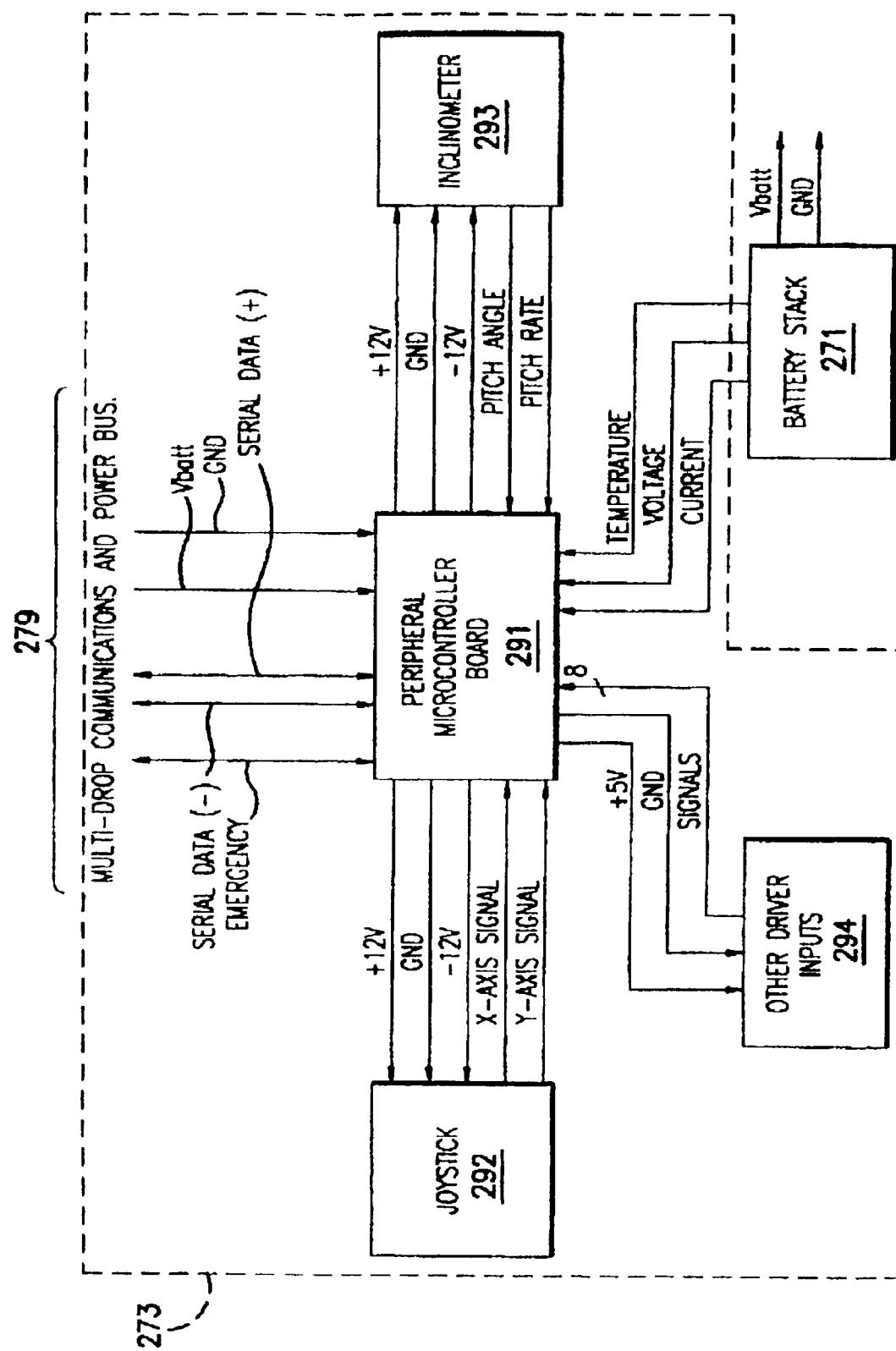
FIG. 6 is a block diagram providing detail of a driver interface assembly.

FIG. 6 is a block diagram providing detail of a driver interface assembly 273. A peripheral microcomputer board 291 receives an input from joystick 292 as well as from inclinometer 293 or another tilt-determining arrangement. The inclinometer provides information signals as to pitch and pitch rate. (The term "inclinometer" as used in this context throughout this description and in the accompanying claims means any device providing an output indicative of pitch or pitch rate, regardless of the arrangement used to achieve the output; if only one of the pitch and pitch rate variables is provided as an output, the other variable can be obtained by suitable differentiation or integration with respect to time.) To permit controlled banking into turns by the transporter (thereby to increase stability while turning) it is also feasible to utilize a second inclinometer to provide information as to roll and roll rate or, alternatively, the resultant of system weight and centrifugal force. Other inputs 294 may also be desirably provided as an input to the peripheral micro controller board 291. Such other inputs may include signals gated by switches (knobs and buttons) for platform adjustment and for determining the mode of operation. The peripheral micro controller board 291 also has inputs for receiving signals from the battery stack 271 as to battery voltage, battery current, and battery temperature. The peripheral micro controller board 291 is in communication over bus 279 with a central micro controller board that may be used to control the wheel motors as described below in connection with FIG. 7.

Figure 7:
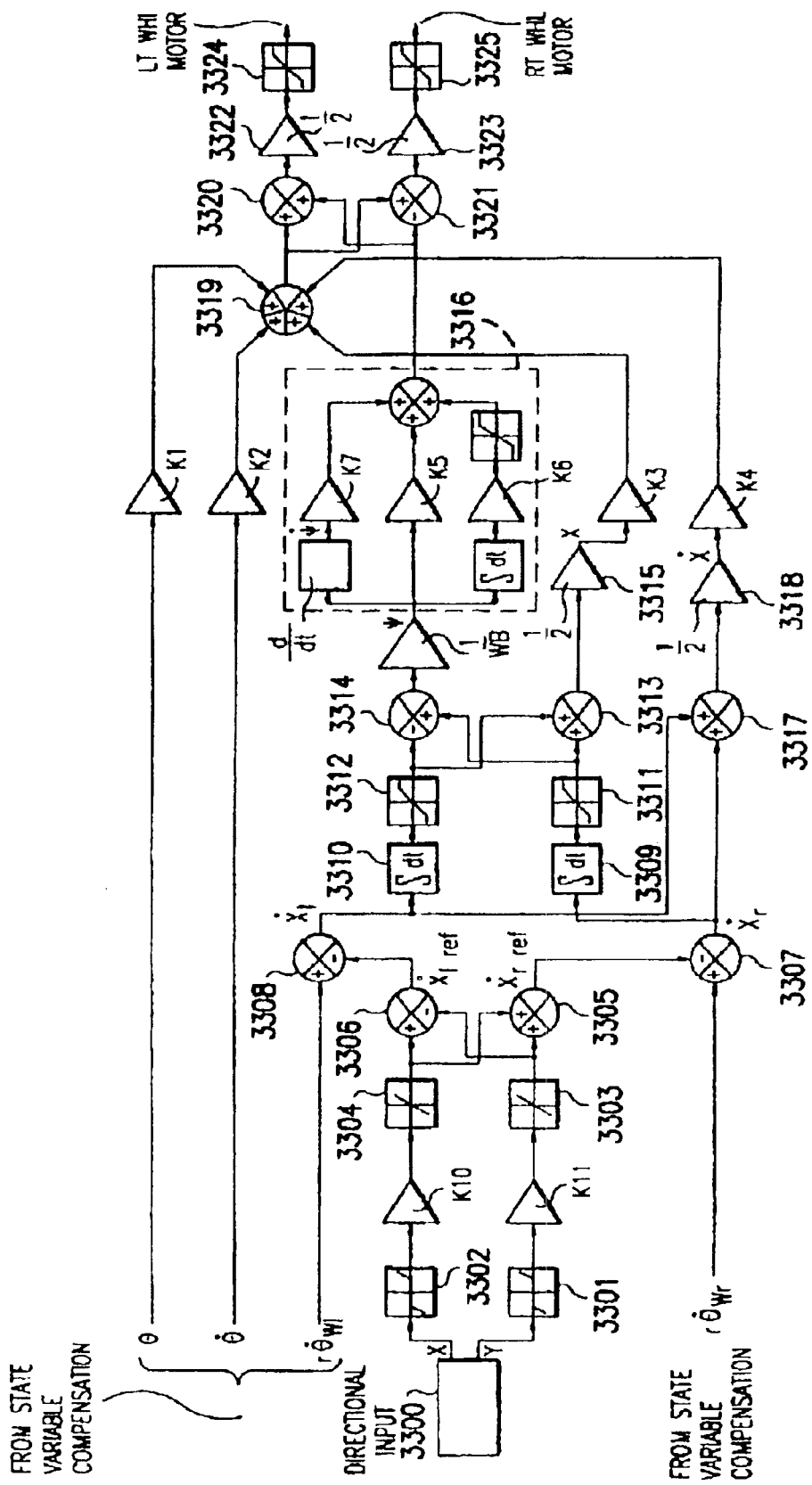
FIG. 7 is a schematic of the wheel motor control during balancing and normal locomotion, in accordance with an embodiment of the present invention.

FIG. 7 is a block diagram showing control algorithms, suitable for use in conjunction with the control assemblies of FIG. 6 to provide stability for a transporter according to the embodiment of FIGS. 1-2 and other embodiments in which the transporter and payload are balanced on two ground-contacting members, both during locomotion and in a fixed position. The following conventions are used in connection with the description below:

1. Variables defined in world coordinates are named using a single subscript in capital letters. World coordinates are coordinates fixed to the earth (inertial).

2. A non-subscripted r identifies a wheel radius.

3. Lower case subscripts are used to indicate other attributes, e.g., right/left, etc.: r=right; l=left; ref=reference; f=finish; s=start.

4. All angles are positive in the clockwise direction, where positive travel is in the positive x direction.

5. A dot over a variable indicates differentiation in time, e.g., $\dot{\theta}$.

FIG. 7 shows the control arrangement for the motors of the right and left wheels. The arrangement has inputs of $\theta$, $\dot{\theta}$, $r\dot{\theta}_{wl}$ (linear velocity of the left wheel relative to the world coordinate system) and $r\dot{\theta}_{wr}$ (linear velocity of the right wheel), in addition to directional inputs 3300 determined by joystick position along X and Y axes of a reference coordinate system. Inputs $\theta$, $\theta\dot{\theta}$, and error signals x and $\dot{x}$ (described below), subject to gains $K_1$, $K_2$, $K_3$, and $K_4$ respectively, become inputs to summer 3319, which produces the basic balancing torque command for the wheels, in the general manner described above in connection with FIG. 3 above. The output of summer 3319 is combined with the output of yaw PID loop 3316 (described below) in summer 3320, then divided in divider 3322 and limited in saturation limiter 3324, to produce the left wheel torque command. Similarly, the output of summer 3319 is combined with the output of PID loop 3316 in summer 3321, then divided in divider 3323 and limited in saturation limiter 3325, to produce the right wheel torque command.

In FIG. 7, a directional input along the X axis moves the reference coordinate system along its X axis relative to the world coordinate system (which represents the traveled surface), at a velocity proportional to the displacement of the joystick. A directional input along the Y axis rotates the reference coordinate system about its Z axis at an angular velocity proportional to the displacement of the joystick. It will be appreciated that motion of the joystick in the positive X direction is here interpreted to mean forward motion; motion of the joystick in the negative X direction means reverse motion. Similarly, motion of the joystick in the positive Y direction means leftward turning, counterclockwise as viewed from above; motion of the joystick in the negative Y direction means rightward turning clockwise as viewed from above. Hence the directional inputs Y and X are given deadband via deadband blocks 3301 and 3302 respectively, to widen the neutral position of the joystick, then subject to gains K11 and K10, then rate-limited by limiters 3303 and 3304 respectively, which limit the angular and linear accelerations respectively of the reference coordinate system. The sum of these outputs achieved through summer 3305 becomes the reference velocity $\dot{x}_{r\,ref}$ whereas the difference of these outputs achieved through summer 3306 becomes the reference velocity $\dot{x}_{l\,ref}$. These reference velocities are subtracted in summers 3308 and 3307 from compensated linear velocity input signals $r\dot{\theta}_{wl}$ and $r\dot{\theta}_{wr}$ for left and right wheels to obtain velocity error signals $\dot{x}_l$ and $\dot{x}_r$ for left and right wheels within the reference coordinate system. In turn the average of these signals, determined via summer 3317 and divider 3318, produces a linear velocity error signal. Displacement error signal x is derived by integrating $r\dot{\theta}_{wl}$ and $r\dot{\theta}_{wr}$ in integrators 3310 and 3309, limiting the results in saturation limiters 3312 and 3311, and then averaging their outputs via summer 3313 and divider 3315. The difference between these displacements, determined via summer 3314, produces the yaw error signal $\Psi$.

The yaw error signal $\Psi$ is run through a standard proportional-plus-integral-plus-derivative (PID) control loop 3316, the output of which is combined with the output of the basic balancing torque command of summer 3319, to produce the individual wheel torque commands, which cause the wheels to maintain fore-aft stability and also cause the transporter to align itself with the axes of, and follow the origin of, the reference coordinate system as directed by directional input 3300.

Let us now consider how this control causes the transporter to start. The directional input 3300 (which may be a joystick) will provide a positive x for forward motion. The signal is divided and summed in summers 3308 and 3307, and subtracted from the right and left wheel velocity $\dot{x}_R$ and $\dot{x}_L$ providing a negative correction; this correction leads ultimately to a negative torque contribution at summer 3319, causing the wheels to move backward, so as to create a torque due to gravity that causes the transporter to lean forward. This forward lean leads to changing $\theta$ and $\dot{\theta}$, which leads to positive corrections in summer 3319, causing the transporter to move forward. Thus, moving the joystick forward or backward will cause the transporter to lean forward or backward, as the case may be, and to move in the direction of the lean. This is a property of the control of FIG. 7. An equivalent result can be achieved by leaning, where $K_3$ is zero.

Acceleration of the transporter may be established by system lean. For example, to achieve forward acceleration of the transporter by forward system lean; the center of gravity of the system (transporter and payload) would be placed forward of the center of the pressure distribution of the contact region where the wheels contact the ground—the more the lean, the more the acceleration. Thus, furthermore, it can be seen that leaning, in conjunction with gravity and friction, determines acceleration (positive or negative) of the system. In this manner, if the transporter is moving forward, pitching the system back will achieve braking. Because the transporter must overcome friction, there is typically some system lean when the transporter is moving at constant velocity over level ground. In other words, looking at the torque on the transporter caused by gravity and the torque caused by all other external forces, the torque applied by the motorized drive is adjusted so that the net torque from all these sources produces a desired acceleration.

In a further embodiment of the present invention, any of the foregoing embodiments of a transporter in accordance with the present invention may be provided with wheel torque, T, controlled according to Eqn. 5, which is a modified version of Eqn. 4.

$$T=K_1(\theta-\theta_0)+K_2(\dot{\theta}-\dot{\theta}_0)+K_3(x+x_0)+K_4\dot{x} \quad \text{(Eqn. 5)}.$$

where $K_1=K_1'$ when the pitch angle offset, $\theta-\theta_0$, is greater than or equal to zero;

$K_1=K_1''$ when the pitch angle offset, $\theta-\theta_0$, is less than zero;

$K_2=K_2''$ when the pitch rate offset, $\dot{\theta}-\dot{\theta}_0$, is greater than or equal to zero;

$K_2=K_2'$ when the pitch angle offset, $\dot{\theta}-\dot{\theta}_0$, is less than zero;

$\dot{\theta}_0$ represents the magnitude of a system pitch rate offset. Other definitions are as for Eqn. 4.

The gain coefficients, $K_1'$, $K_1''$, $K_2'$, and $K_2''$ may be configured, either in design of the system or in real-time, on the basis of a current operating mode and operating conditions as well as preferences of a user. When gains $K_1'=K_1''$ and $K_2'=K_2''$ and the system pitch rate offset, $\dot{\theta}_0$, is zero, Eqn. 5 simplifies to Eqn. 4.

The separation of gains $K_i'$ and $K_i''$, where i=1, 2, in Eqn. 5 allows the response of the transporter to be tailored, for example, to rider preferences. For example, setting gain $K_1''>K_1'$ makes the transporter more responsive to changes in pitch that are aft of the pitch offset angle than pitch changes that are forward of this angle. Control of the transporter in this fashion may be advantageous, allowing a rider more (negative) acceleration with the same degree of lean in the aft direction than would be produced by a similar lean in the forward direction. Thus, this arrangement advantageously allows more responsive braking than acceleration in the forward direction. Note that Eqn. 5 allows the contributions from the separate gains to change smoothly since the terms $\theta-\theta_0$ and $\dot{\theta}-\dot{\theta}_0$ are zero when the corresponding gains switches from one value to the other.

Figure 9A:
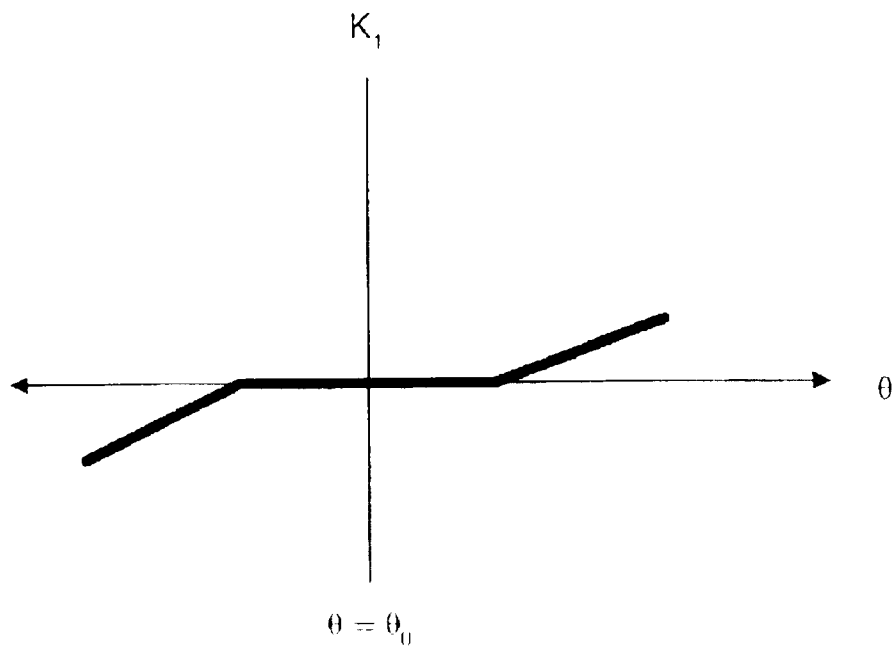
FIG. 9 illustrates non-linear gains for a transporter.
Figure 9B:
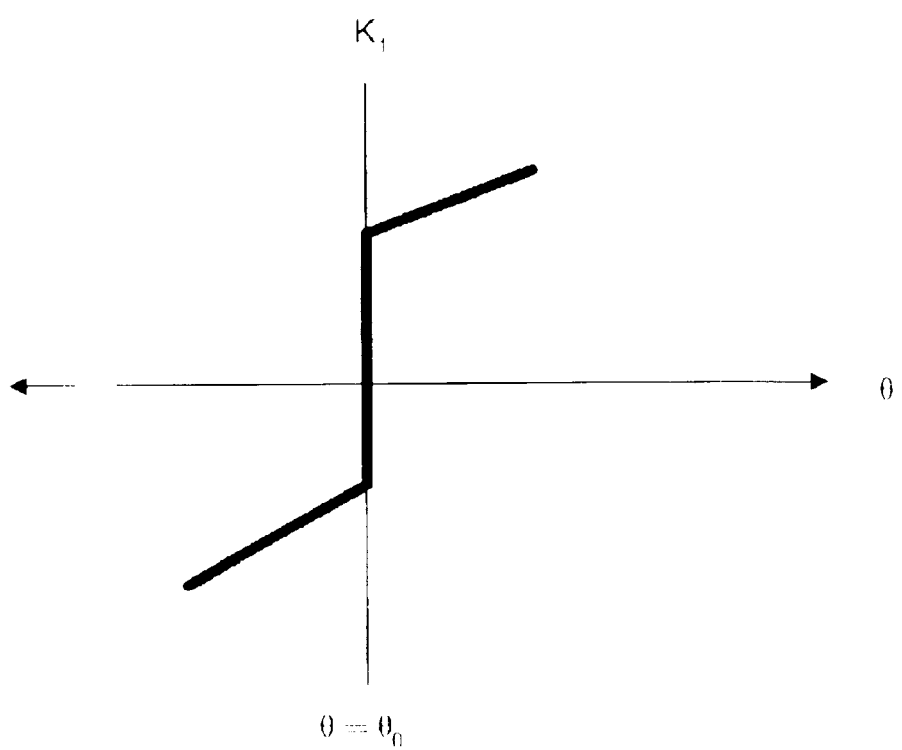

Any of $K_1'$, $K_1''$, $K_2'$, and $K_2''$ may vary as a function of $\theta$ and $\dot{\theta}$. This function may be non-linear. For example, if $K_1'$ and $K_1''$ are each zero for $\theta_0-\theta_d \leq \theta \leq \theta_0+\theta_d$ and non-zero otherwise, as illustrated in FIG. 9A, then a "deadband" has been introduced about $\theta=\theta_0$. Changes of pitch angle in this zone will not cause additional net torque to be applied to the transporter. This arrangement will advantageously widen the "neutral" zone about $\theta=\theta_0$. Likewise, if $K_1'$ and $K_1''$ are as pictured in FIG. 9B, where the magnitude of K, is always non-zero, then a net torque will always be applied to the transporter to compensate for friction.

Eqn. 5 may be recast in terms of the voltage applied to the drive of an electric motor to produce an output torque. The drive need not be electric and some value other than torque or voltage may be used in control of the transporter, according to a control equation similar to Eqn. 5. All such embodiments are within the scope of the invention.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A device for carrying a user, the device comprising:
   a. a platform which supports a payload including the user,
   b. a ground-contacting module, mounted to the platform, including at least one ground-contacting member, characterized by a ground contact region, and defining a fore-aft plane;
   c. a motorized drive arrangement, coupled to the ground-contacting module; the drive arrangement, ground-contacting module and payload constituting a system being unstable with respect to tipping in at least the fore-aft plane when the motorized drive is not powered, the system characterized by a pitch angle offset from a specified pitch angle and a pitch rate offset from a specified pitch rate; and
   d. a control loop in which the motorized drive arrangement is included, for dynamically maintaining stability of the system in the fore-aft plane by operation of the motorized drive arrangement so that the net torque experienced by the system about the region of contact with the surface causes a specified acceleration of the system, the net torque including a contribution related to the pitch angle offset multiplied by a first gain wherein the first gain is a function of at least one of an orientation and a displacement of the device.

2. A balancing transporter characterized by an instantaneous displacement and orientation, the transporter comprising:
   a. a motorized drive for propelling the transporter;
   b. a control loop in which the motorized drive arrangement is included, for dynamically maintaining stability of the system in the fore-aft plane by operation of the motorized drive arrangement so that the net torque experienced by the system about the region of contact with the surface causes a specified acceleration of the system, the net torque including a contribution functionally related to at least one of the pitch angle, pitch rate, wheel position and wheel velocity, wherein the functional relation varies with at least one of an orientation and a displacement of the device.

3. A method for carrying a payload including a user with a transporter, the method comprising:

a. providing a transporter including:
  i. a platform which supports a payload including the user,
  ii. a ground-contacting module, mounted to the platform, including at least one ground-contacting member, characterized by a ground contact region and a fore-aft plane;
  iii. a motorized drive arrangement, coupled to the ground-contacting module; the drive arrangement, ground-contacting module and payload constituting a system being unstable with respect to tipping in at least the fore-aft plane when the motorized drive is not powered, the system characterized by a pitch angle offset from a specified pitch angle and a pitch rate offset from a specified pitch rate; and b. causing the motorized drive to operate the ground-contacting module using a control loop in which the motorized drive arrangement is included, for dynamically maintaining stability of the system in the fore-aft plane by operation of the motorized drive arrangement so that the net torque experienced by the system about the region of contact with the surface causes a specified acceleration of the system, the net torque including:
  i. a contribution related to the pitch angle offset multiplied by a first gain $K_1'$ when the pitch angle offset is greater than or equal to zero and to the pitch angle offset multiplied by a second gain $K_1''$ when the pitch angle offset is less than zero; and
  ii. a contribution related to the pitch rate offset multiplied by a third gain $K_2'$; when the pitch rate offset is greater than or equal to zero and to the pitch rate offset multiplied by a fourth gain $K_2''$ when the pitch rate offset is less than zero, wherein at least one of a first gain pair consisting of $K_1'$ and $K_1''$ and a second gain pair consisting of $K_2'$ and $K_2''$ are unequal.

4. A method according to claim 3 wherein the magnitude of $K_1'$ is less than the magnitude of $K_1''$.

5. A method according to claim 3 wherein $K_2'$ equals $K_2''$.

* * * * *